(12) United States Patent
Lee

(10) Patent No.: US 7,520,283 B2
(45) Date of Patent: Apr. 21, 2009

(54) WATER LEVEL SENSOR AND DISHWASHER HAVING THE SAME

(75) Inventor: Jae Hyuk Lee, Busan (KR)

(73) Assignee: LG Electronics Inc., Seoul (KR)

( * ) Notice: Subject to any disclaimer, the term of this patent is extended or adjusted under 35 U.S.C. 154(b) by 516 days.

(21) Appl. No.: 11/055,592

(22) Filed: Feb. 11, 2005

(65) Prior Publication Data

US 2005/0284506 A1    Dec. 29, 2005

(30) Foreign Application Priority Data

Jun. 24, 2004   (KR) ...................... 10-2004-0047441

(51) Int. Cl.
*B08B 3/00* (2006.01)
(52) U.S. Cl. .................... 134/57 D; 134/58 D; 134/113
(58) Field of Classification Search ............... 134/56 D, 134/113; 73/311
See application file for complete search history.

(56) References Cited

U.S. PATENT DOCUMENTS

| | | | | |
|---|---|---|---|---|
| 3,342,960 A | * | 9/1967 | Acampora et al. | 200/84 C |
| 3,464,437 A | * | 9/1969 | Zane | 137/387 |
| 3,678,232 A | * | 7/1972 | Hodges | 200/84 C |
| 4,178,957 A | * | 12/1979 | Hoffman et al. | 137/387 |
| 4,271,861 A | * | 6/1981 | Crawford | 137/387 |
| 5,018,550 A | | 5/1991 | Burdorff | |
| 6,464,465 B2 | * | 10/2002 | House | 417/40 |

FOREIGN PATENT DOCUMENTS

| | | |
|---|---|---|
| DE | 1401763 A1 | 3/1962 |
| DE | 2 261 604 A1 | 12/1972 |
| EP | 0 958 777 A1 | 11/1999 |
| JP | 8-261558 * | 10/1996 |
| JP | 9-108162 * | 4/1997 |
| JP | 9-108162 A | 4/1997 |
| JP | 2002-306394 * | 10/2002 |
| WO | WO 02/064010 A2 | 8/2002 |

* cited by examiner

*Primary Examiner*—Frankie L Stinson
(74) *Attorney, Agent, or Firm*—McKenna Long & Aldridge LLP

(57) ABSTRACT

A water level sensor and a dishwasher having the same are disclosed, in which water level is sensed for stable supply of washing water. The water level sensor includes a case including a first chamber formed therein, a first floater provided in the first chamber, ascending as water level ascends, and a first switch selectively pressurized by the first floater to avoid excessive supply of water.

5 Claims, 5 Drawing Sheets

WATER LEVEL SENSOR AND DISHWASHER HAVING THE SAME

This application claims the benefit of Korean Application No. P2004-47441 filed on Jun. 24, 2004, which is hereby incorporated by reference as if fully set forth herein.

BACKGROUND OF THE INVENTION

1. Field of the Invention

The present invention relates to a dishwasher, and more particularly to, a water level sensor and a dishwasher having the same, in which level of washing waster is sensed.

2. Discussion of the Related Art

Generally, a dishwasher is to remove dirt on dishes by spraying washing water to the dishes at high pressure and dry the dishes.

The dishwasher includes a cabinet, a door opening and closing the front of the cabinet, a sump, and a pump.

The cabinet constitutes appearance of the dishwasher and is provided with a tub constituting a washing space.

A door is provided at the front of the cabinet to open and close the washing space, and racks are provided inside the tub to receive dishes. The sump is provided at the bottom of the tub to store washing water therein.

The pump is provided at the lower portion of the tub to pump the washing water stored in the sump at high pressure. A motor is provided at the rear of the pump to drive the pump.

The racks are divided into an upper rack provided in the upper space of the tub and a lower rack provided below the upper rack.

A top nozzle is provided at the upper portion of the upper rack while a lower nozzle is provided at the lower portion of the lower rack. An upper nozzle is provided between the upper rack and the lower rack.

The nozzles are connected with a water guide, and dishes received in the racks are washed by spraying the washing water through the nozzles at high pressure.

The washing water pumped by the pump is guided by the water guide provided at one side of the tub and is sprayed toward the dishes received in the racks through the nozzles.

Since the dishwasher requires an appropriate amount of washing water to wash dishes, it is necessary to develop a dishwasher in which excessive supply of washing water is avoided and failure due to leakage of washing water is prevented from occurring.

SUMMARY OF THE INVENTION

Accordingly, the present invention is directed to a water level sensor and a dishwasher having the same that substantially obviates one or more problems due to limitations and disadvantages of the related art.

An object of the present invention is to provide a water level sensor and a dishwasher having the same, in which water level is sensed for stable supply of washing water.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a water level sensor includes a case including a first chamber formed therein, a first floater provided in the first chamber, ascending as water level ascends, and a first switch selectively pressurized by the first floater to avoid excessive supply of water.

The first floater is supported at a predetermined height from the bottom of the case.

The case includes a support supporting the first floater at a predetermined height.

The support is projected from either an inner wall of the case or the bottom of the case.

The first switch is pressurized by the first floater to input an excessive water supply signal.

The case further includes a second chamber formed at one side of the first chamber to connect with the first chamber.

The water level sensor further includes a second floater provided in the second chamber and a second switch selectively pressurized prior to the first switch by the second floater to input a water level signal.

The second switch inputs a leakage signal if it is released from its pressurized state as water level descends during water supply.

In another aspect, a dishwasher includes a sump storing washing water therein, and a water level sensor sensing water level of the washing water stored in the sump, wherein the water level sensor includes a case having a first chamber formed therein, a first floater provided in the first chamber, ascending as water level ascends, and a first switch selectively pressurized by the first floater to avoid excessive supply of water.

The first floater is supported at a predetermined height from the bottom of the case.

The case includes a support supporting the first floater at a predetermined height.

The support is projected from either an inner wall of the case or the bottom of the case.

The first switch is pressurized by the first floater to input an excessive water supply signal.

The case further includes a second chamber formed at one side of the first chamber to connect with the first chamber.

The dishwasher further includes a second floater provided in the second chamber and a second switch selectively pressurized prior to the first switch by the second floater to input a water level signal.

The second switch inputs a leakage signal if it is released from its pressurized state as water level of the sump descends during water supply.

The second switch inputs a leakage signal if it is released from its pressurized state as water level of the sump descends in a state that the dishwasher does not work.

The second switch is provided at a ceiling of the second chamber substantially flush with the first chamber, and the second floater is longer than the first floater.

The water level sensor is provided with a separate power terminal.

The dishwasher further includes a display displaying signals input by the first switch and the second switch.

The display includes an alarm portion alarming excessive water supply or leakage of water.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A dishwasher according to the present invention will be described with reference to FIG. 1.

Figure 1:
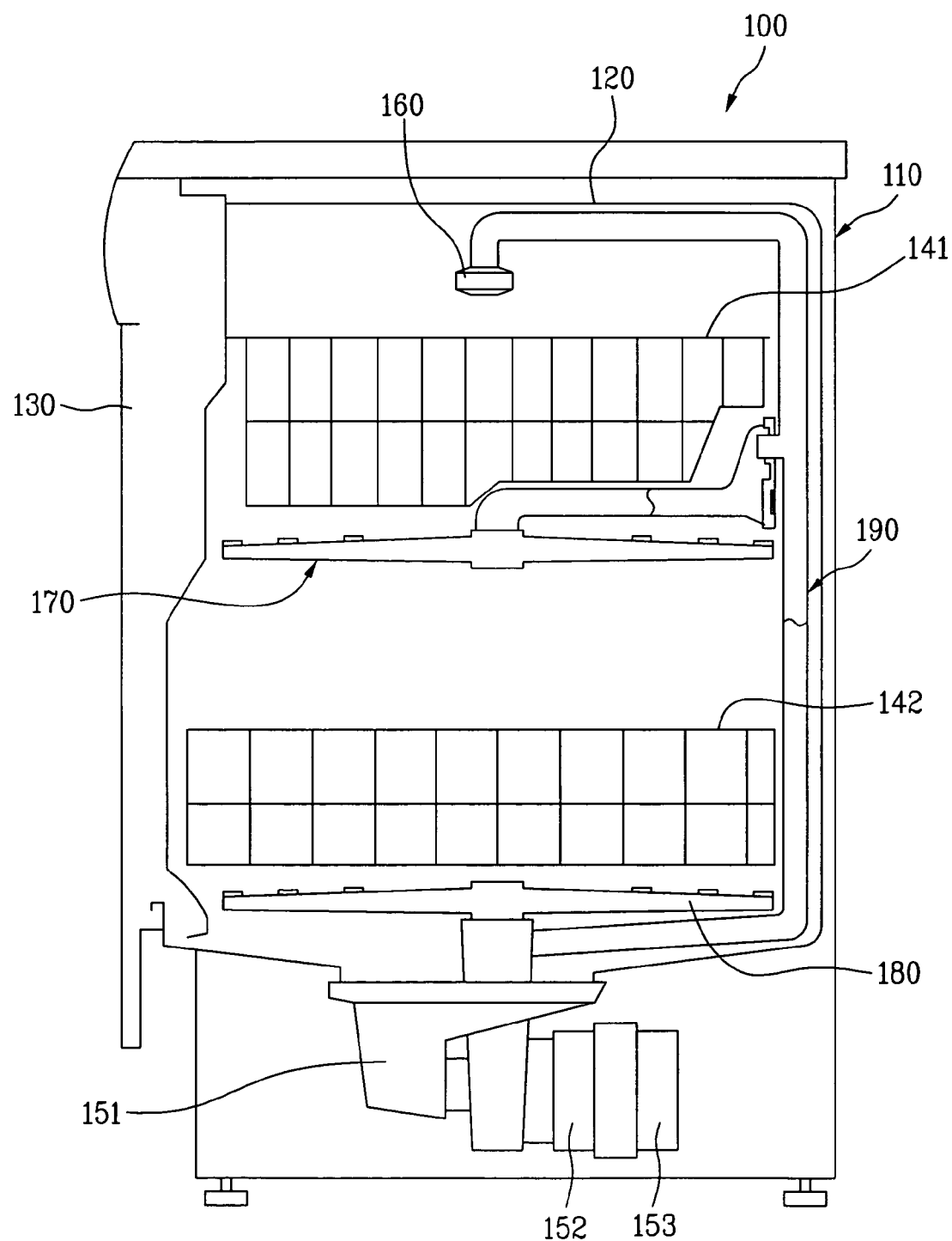
FIG. 1 is a longitudinal sectional view illustrating a dishwasher according to the present invention.

Referring to FIG. 1, a dishwasher 100 of the present invention includes a cabinet 110 constituting appearance, a tub 120 provided inside the cabinet 110 to form a dish washing space, and a door 130 provided at the front of the cabinet to open and close. At least one or more racks 141 and 142 are provided inside the tub 120 to receive dishes.

In more detail, the upper rack 141 is provided at the upper portion of the tub 120 while the lower rack 142 is provided at the lower portion of the tub 120.

Rollers (not shown) are provided underneath the upper and lower racks 141 and 142. The rollers are supported by rails (not shown) provided at inner sides of the tub 120. Thus, the racks 141 and 142 are moved in front and rear directions by the rollers and the rails.

The tub 120 is provided with a sump 151, a pump 152, and a motor 153 at the lower side. The sump 151 stores washing water therein. The pump 152 is connected with the sump 151 and is driven by the motor 153.

Further, a top nozzle 160 is provided above the upper rack 141 while an upper nozzle 170 is provided below the upper rack 141. A lower nozzle 180 is provided below the lower rack 142.

The top nozzle 160, the upper nozzle 170, and the lower nozzle 180 are connected with a water guide 190 that guides washing water pumped by the pump 181. The top nozzle 160 downwardly sprays the washing water while the upper nozzle 170 and the lower nozzle 180 upwardly spray the washing water. Preferably, the upper nozzle 170 may spray the washing water up and down.

Meanwhile, an air brake (not shown) is provided at a side of the dishwasher 100. The air brake supplies the washing water to the sump 151 and drains the washing water of the sump 151.

The air brake is connected with a supply pipe (not shown) that supplies the washing water, and is provided with a flow meter that senses the amount of the supplied washing water.

The dishwasher 100 further includes a water level sensor 200 that senses the level of the washing water inside the sump 151.

Hereinafter, the water level sensor 200 provided in the dishwasher of the present invention will be described with reference to FIG. 2 to FIG. 5.

Figure 2:
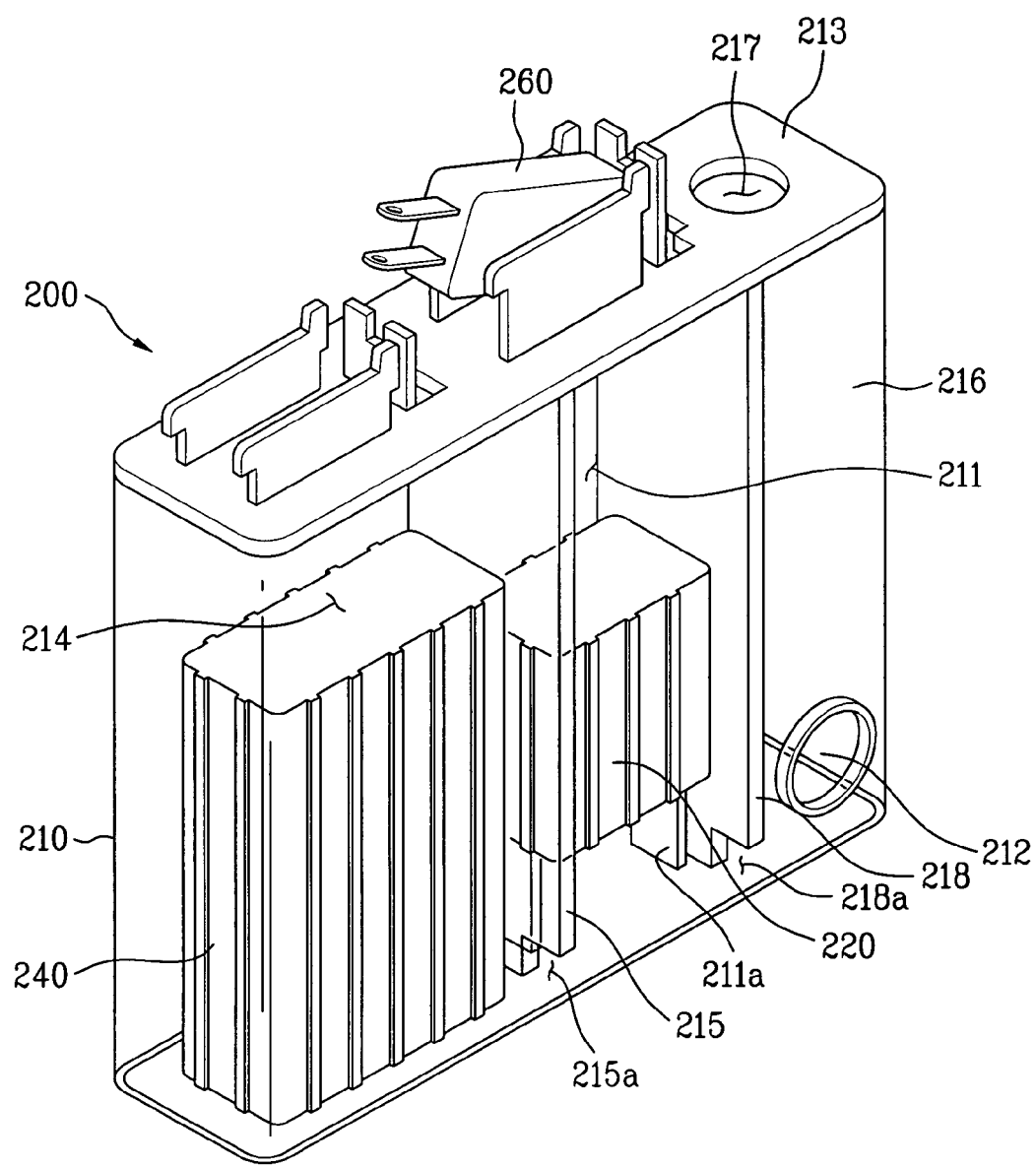
FIG. 2 is a perspective view illustrating a water level sensor provided in a dishwasher according to the present invention.
Figure 3:
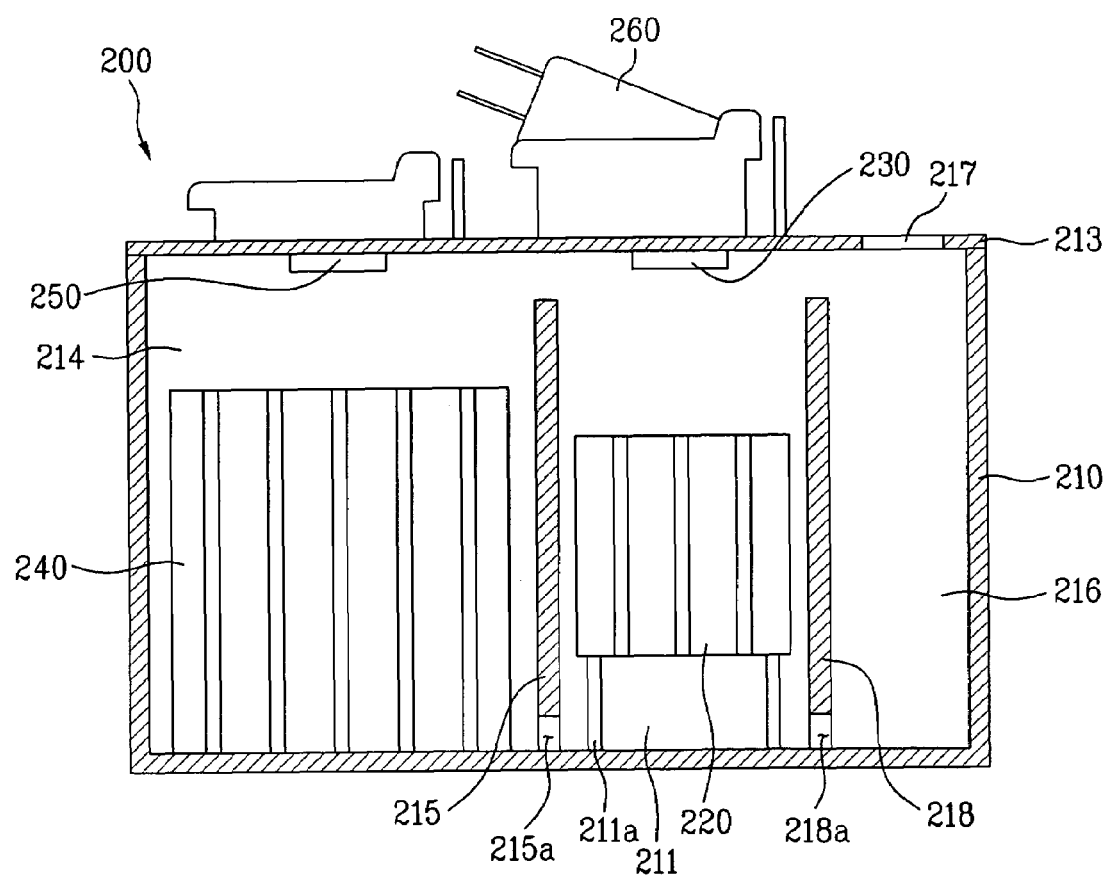
FIG. 3 is a longitudinal sectional view illustrating a water level sensor shown in FIG. 2.
Figure 4:
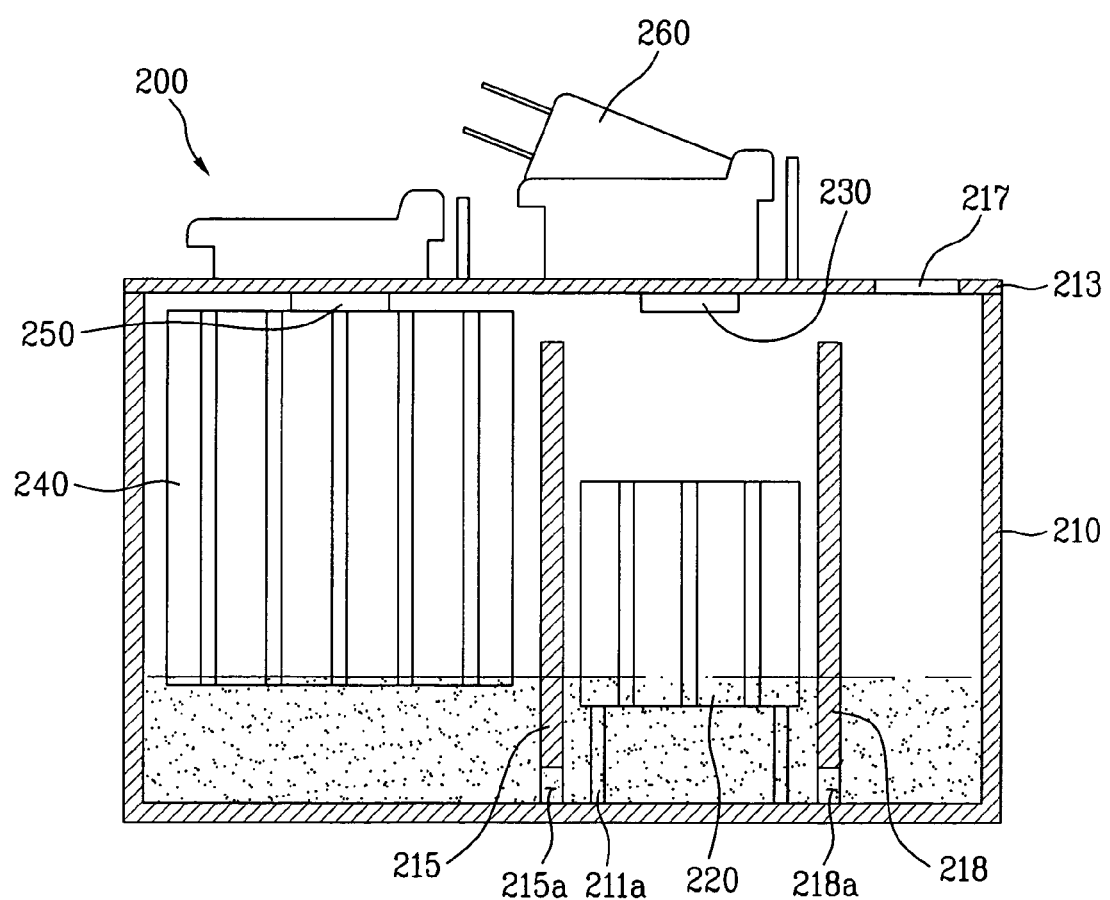
FIG. 4 is a longitudinal sectional view illustrating the state that water level inside a water level sensor of FIG. 2 reaches a first water level.
Figure 5:
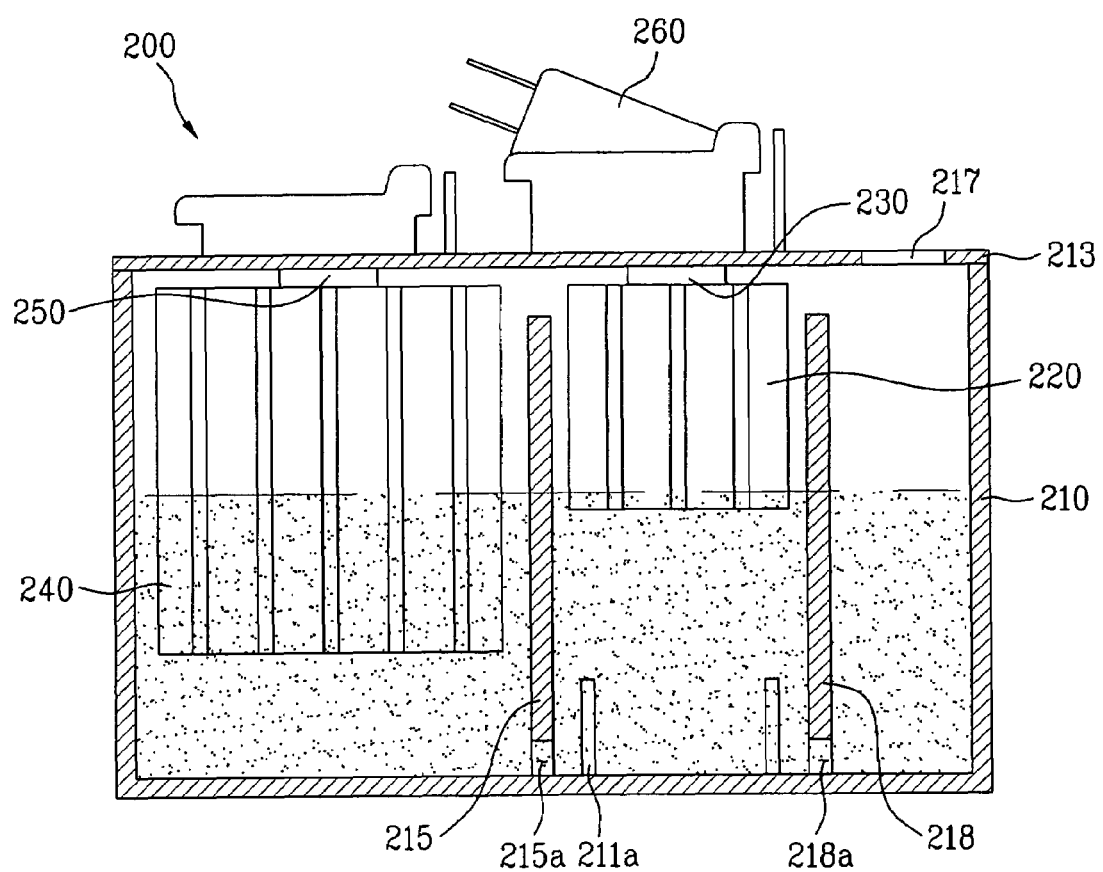
FIG. 5 is a longitudinal sectional view illustrating the state that water level inside a water level sensor of FIG. 2 reaches a second water level.

FIG. 2 is a perspective view illustrating the water level sensor provided in the dishwasher according to the present invention, FIG. 3 is a longitudinal sectional view illustrating the water level sensor shown in FIG. 2, FIG. 4 is a longitudinal sectional view illustrating the state that water level inside the water level sensor of FIG. 2 reaches a first water level, and FIG. 5 is a longitudinal sectional view illustrating the state that water level inside the water level sensor of FIG. 2 reaches a second water level.

The water level sensor 200 includes a case 210, a first floater 220 provided inside the case 210, and a first switch 230 pressurized by the first floater 220.

A first chamber 211 is formed inside the case 210 to receive the first floater 220, and a sump opening 212 is formed at a side of the case 210. The sump opening 212 connects with the sump 151 to make water level of the sump 151 equal to that of the first chamber 211.

A cover 213 is provided at the top of the case 210 to cover the case 210.

Next, the first floater 220 ascends by means of the washing water as water level of the first chamber 211 ascends, so that it selectively pressurizes the first switch 230.

The first switch 230 is provided at an upper side of the first chamber 211, specifically, the ceiling of the case 210, i.e., the bottom of the cover 213 constituting the ceiling of the first chamber 211. The first switch 230 is selectively pressurized by the upper portion of the first floater 220.

In other words, if the upper portion of the first floater 220 reaches the bottom of the cover 213 as the first floater 220 ascends by means of the washing water, the first switch 230 is pressurized by the first floater 220 to avoid excessive supply of the washing water.

In more detail, if the washing water stored in the sump 151 is about to overflow due to continuous supply of the washing water to the sump 151, the first floater 220 ascends by means of the washing water inside the first chamber 211 connected with the sump 151 and the first switch 230 is pressurized by the first floater 220.

Then, the first switch 230 inputs an excessive water supply signal to a controller (not shown), and the controller allows the washing water stored in the sump 151 to be drained out and/or stopped from being supplied.

If the first switch 230 is pressurized, a signal to drain the washing water stored in the sump 151 and/or stop supply of the same may directly be transmitted to a drainage or a water supplier provided at the air brake without through the controller.

Meanwhile, the first floater 220 is spaced apart at a predetermined height from the bottom of the case 210.

The first chamber 211 is provided with a support 211a to support the first floater 220. The support 211a is projected from either the inner wall of the first chamber 211 or the bottom of the first chamber 211 to prevent the first floater 220 from being operated in error due to contaminants between the first floater 220 and the inner wall of the first chamber 211.

In the present invention, to support the bottom of the first floater 220, the support 211a is upwardly extended at a predetermined height in a state that its lower end is fixed to the bottom of the first chamber 211. Alternatively, the support 211a may horizontally be projected from both facing sidewalls of the first chamber 211 to support the lower portion of the first floater 220.

In other words, the support 211a may downwardly be extended at a predetermined length in a state that its upper end is fixed to the lower portion of the floater 220.

Moreover, the case 210 further includes a second chamber 214 connected with the first chamber 211.

The second chamber 214 is formed at one side of the first chamber 211, and a second floater 240 is provided inside the second chamber 214. The second floater 240 ascends by means of the washing water.

A second switch 250 is provided at the ceiling of the second chamber 214 and is selectively pressurized by the second floater 240. The second switch 250 is pressurized prior to the first switch 230 to input a water level signal indicating that the washing water of the sump has reached a predetermined water level.

Under the condition that the first chamber 211 has the same height as that of the second chamber 214, the second floater 240 is formed to be longer than the first floater 220 so that the second switch 250 is pressurized prior to the first switch 230.

It is apparent that the first chamber 211 may be higher than the second chamber 214 so that the second switch 250 is pressurized prior to the first switch 230.

The first chamber 211 and the second chamber 214 are partitioned by a first barrier wall 215.

A first opening 215a is formed at the lower portion of the first barrier wall 215 to connect the first chamber 211 with the second chamber 214.

Meanwhile, a water supply chamber 216 connected with the first chamber 211 is formed at the other side of the first chamber 211, i.e., at an opposite side of the second chamber 214.

A washing water supply opening 217 is formed at the upper portion of the water supply chamber 216 to supply the washing water to the water supply chamber 216. Since the sump opening 212 is formed at a lower side of the water supply chamber 216, the washing water supplied to the water supply chamber 216 is supplied to the sump 151 through the sump opening 212.

The first chamber 211 and the water supply chamber 216 are partitioned by a second barrier wall 218. A second opening 218a is formed at the lower portion of the second barrier wall 218 to connect the first chamber 211 with the water supply chamber 216.

The aforementioned water level sensor 200 is provided with a separate power terminal 260 so that the power source is supplied thereto separately from the dishwasher.

The power terminal 260 is preferably spaced apart from at a predetermined distance from the washing water supply opening 217 to avoid leakage current.

Preferably, the cabinet 110 of the dishwasher is provided with a display (not shown) that displays signals input by the first switch 230 and the second switch 250.

The display may be provided with an alarm portion that alarms excessive supply of washing water or leakage of washing water.

In the aforementioned present invention, if the second switch 250 is pressurized by the second floater 240, the signal indicating that the washing water of the sump 151 has reached a predetermined water level is transmitted to the display through the controller or is directly input to the display.

If the water level inside the first chamber 211 and the second chamber 214 descends as the water level of the sump 151 descends during continuous supply of the washing water to the sump 151, the second switch 250 is released from the pressurized state. In such case, the second switch 250 inputs a leakage signal to the controller or the display.

Furthermore, since the power source is supplied to the water level sensor in a state that the dishwasher does not work, the water level of the sump 151 descends in such state. Thus, the second switch 250 is released from the pressurized state. In this case, the second switch 250 inputs the leakage signal to the controller or the display.

The operation of the aforementioned water level sensor and the dishwasher having the same will be described with reference to FIG. 4 and FIG. 5.

First, the operation of the water level sensor will be described.

If the water level of the sump 151 ascends as the washing water is supplied into the dishwasher through the air brake, the water levels of the first chamber 211, the second chamber 214 and the water supply chamber 216 ascend to be flush with the water level of the sump 151.

If the water level of the sump 151 reaches a predetermined water level, the second floater 240 pressurizes the second switch 250 to stably supply the washing water to the sump 151. The signal indicating that the washing water has reached a predetermined water level is input to the display. The display displays water level information of the sump 151.

In the present invention, the water level of the second chamber 214, i.e., the level of the sump 151 at the time when the second switch 250 is pressurized is called a first level.

If the second switch 250 is released from the pressurized state while supply of the washing water continues, the second switch inputs the leakage signal to the display and the display displays such leakage information.

At this time, the leakage information may be displayed as an alarm signal through the alarm portion. Preferably, if the leakage signal is input, the washing water is stopped from being supplied and at the same time is drained.

Meanwhile, if the first floater 220 pressurizes the first switch 230 as the water level of the sump 151 is about to overflow due to continuous supply of the washing water without any leakage, the washing water stored in the sump 151 is drained and/or stopped from being supplied. At the same time, information on excessive supply of the washing water to the sump is displayed in the display.

The water level of the first chamber 211, i.e., the water level of the sump 151 at the time when the first switch 230 is pressurized is called a second water level.

Next, if the washing water is sufficiently supplied to the sump 151, the washing water stored in the sump 151 is pumped by the pump 152 connected to the motor 153 at high pressure. The washing water pumped at high pressure is sprayed from the top nozzle 160, the upper nozzle 170 and the lower nozzle 180 under the guide of the water guide 190.

The operation of the dishwasher will now be described in more detail.

First, a user opens the door 130 of the dishwasher 100 and draws the upper rack 141 and/or the lower rack 142 toward the front of the cabinet 110.

After dishes are received in the upper rack 141 and/or the lower rack 142 and the door 130 is closed, the power source is applied to the dishwasher 100. Then, the dishwasher 100 performs a washing step.

If the washing step is performed, the washing water is supplied to the sump 151. If the washing water is stopped from being supplied to the sump 151, the motor 153 is operated.

An impeller (not shown) provided inside the pump 152 and connected with the motor 153 is rotated by driving of the motor 153. In this case, the washing water stored in the sump

151 is pumped and is supplied to the top nozzle 160, the upper nozzle 170, and the lower nozzle 180 along the water guide 190.

Next, the washing water is sprayed toward the upper rack 141 and the lower rack 142 through the top nozzle 160, the upper nozzle 170, and the lower nozzle 180 to wash dishes received in the upper rack 141 and the lower rack 142. The top nozzle 160 downwardly sprays the washing water, the upper nozzle 170 sprays the washing water up and down while rotating, and the lower nozzle 180 upwardly sprays the washing water.

If the washing step is finished, the washing water contaminated by the washing step is collected in the sump 151 and the contaminated washing water is filtered by a filter (not shown) to remove contaminants. The washing water is finally drained outside the dishwasher through a drain pump (not shown).

Furthermore, if the washing water is drained outside the dishwasher, clean water is supplied to the sump 151 through a washing water inlet (not shown). Afterwards, the above washing step is repeated several times. A rinsing step is then performed. If the rinsing step ends, a drying step is performed. The whole washing operation of dishes is finally finished.

The aforementioned water level sensor and the dishwasher having the same have the following advantages.

First, the water level sensor provided in the dishwasher enables stable supply of the washing water and prevents excessive supply of the washing water.

Second, since the water level sensor has no electrical sensor, failure due to leakage current is avoided.

Third, since the first floater is supported at a predetermined height from the bottom of the case, it is prevented from being operated in error due to contaminants on the bottom of the case.

Finally, since the water level sensor is provided with a separate power terminal, it is possible to detect whether there is leakage of the washing water even in case that the dishwasher is turned off.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A water level sensor comprising:
    a case including a first chamber, a second chamber to connect with the first chamber and a water supply chamber to connect with the first chamber formed therein and supply water;
    a first floater provided in the first chamber and ascending while a water level ascends;
    a first switch provided in the first chamber and pressurized by the ascending of the first floater to detect excessive supply of water;
    a second floater provided in the second chamber and ascending earlier than the first floater while the water level ascends; and
    a second switch provided in the second chamber, pressurized by the ascending of the second floater, and detecting leakage of water when the second floater descends.

2. The water level sensor of claim 1, wherein the first floater is supported at a predetermined height from the bottom of the ease.

3. The water level sensor of claim 2, wherein the case includes a support supporting the first floater at a predetermined height.

4. The water level sensor of claim 3, wherein the support is projected from either an inner wall of the case or the bottom of the case.

5. The water level sensor of claim 1, wherein the first switch is provided at a ceiling of the case.

* * * * *